United States Patent [19]

Togawa et al.

[11] 4,368,474

[45] Jan. 11, 1983

[54] INK DROPLET FORMATION CONTROL IN AN INK JET SYSTEM PRINTER

[75] Inventors: Fumio Togawa, Yamatokoriyama; Yoichi Shimazawa; Hitoshi Suzuki, both of Nara, all of Japan

[73] Assignee: Sharp Kabushiki Kaisha, Osaka, Japan

[21] Appl. No.: 196,256

[22] Filed: Oct. 10, 1980

[30] Foreign Application Priority Data

Oct. 11, 1979 [JP] Japan ............................... 54-131610

[51] Int. Cl.$^3$ ............................................ G01D 15/18

[52] U.S. Cl. ...................................................... 346/75

[58] Field of Search .............. 346/140 R, 140 PD, 75, 346/1.1, 140 IJ; 400/126

[56] References Cited

U.S. PATENT DOCUMENTS

| | | | |
|---|---|---|---|
| 3,683,396 | 8/1972 | Keur et al. | 346/75 X |
| 3,868,698 | 2/1975 | Dressler | 346/75 |
| 3,928,855 | 12/1975 | Helinski et al. | 346/75 X |
| 4,018,383 | 4/1977 | Paton et al. | 346/75 X |

*Primary Examiner*—A. D. Pellinen

*Assistant Examiner*—W. T. Brady

*Attorney, Agent, or Firm*—Birch, Stewart, Kolasch and Birch

[57] ABSTRACT

An ink jet system printer includes a nozzle for emitting an ink liquid under a predetermined pressure, an electro-mechanical transducer secured to the nozzle for vibrating the nozzle in accordance with an excitation signal of a given frequency, thereby forming ink droplets at the given frequency, and a charging tunnel for charging the ink droplets in accordance with print information. A charge condition detection unit is provided for monitoring the charge condition of the ink droplets, the output signal of the charge condition detection unit being indicative of a droplet formation condition. When the output signal of the charge condition detection unit indicates the occurrence of satellite ink droplets in addition to the normal ink droplets, the voltage level of the excitation signal, which is applied to the electrode-mechanical transducer, is varied to eliminate the occurrence of the satellite ink droplets.

16 Claims, 17 Drawing Figures

FIG. 6(A)
FIG. 6(B)
FIG. 6(C)
FIG. 6(D)
FIG. 6(E)
FIG. 6(F)
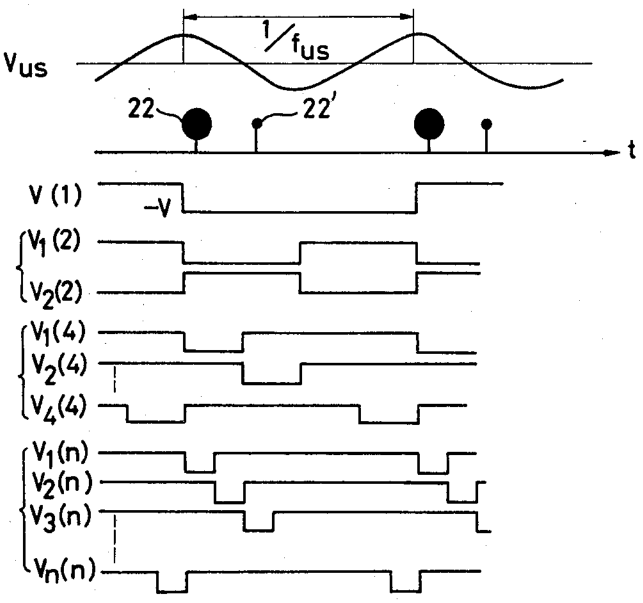
FIG. 7
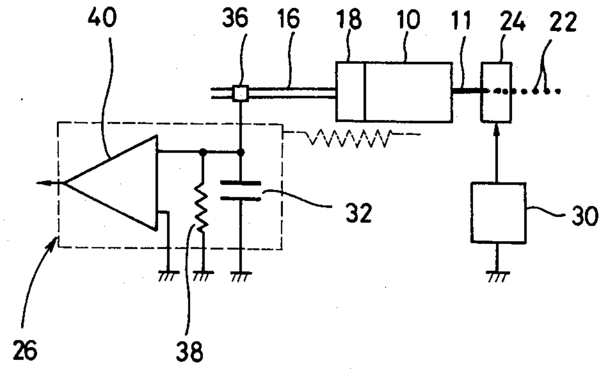

FIG. 8
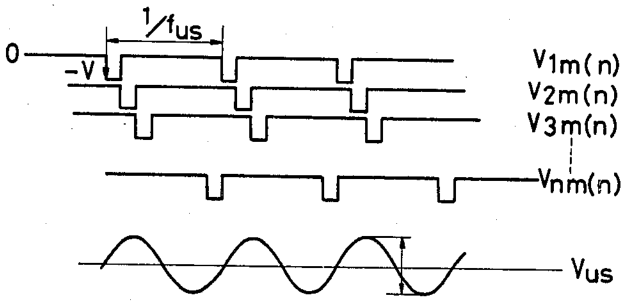
FIG. 9(A)
FIG. 9(B)
FIG. 9(C)
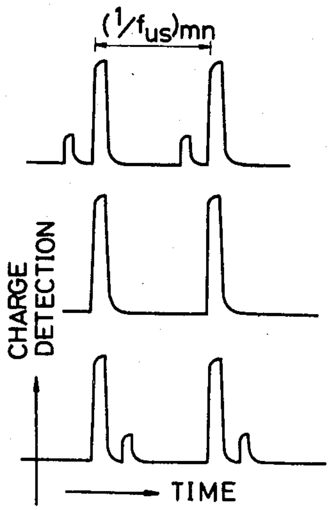

INK DROPLET FORMATION CONTROL IN AN INK JET SYSTEM PRINTER

BACKGROUND AND SUMMARY OF THE INVENTION

The present invention relates to an ink jet system printer including an electro-mechanical transducer secured to a nozzle.

It is required that an ink droplet formation is stabilized in order to ensure a stable operation and an accurate printing. To stabilize the ink droplet formation, an ink jet system printer is proposed, which includes an ink liquid warmer for maintaining an ink liquid temperature at a constant value. However, this type of ink jet system printer can not respond to a rapid change in the ambience temperature and requires a long time period of start-up driving before initiating an actual printing operation. Moreover, it is not warranted that the ink liquid characteristics are fixed even when the ink liquid temperature is held at the constant value.

Accordingly, an object of the present invention is to provide an ink jet system printer for ensuring a stable operation and an accurate printing.

Another object of the present invention is to provide a control system for stabilizing the ink droplet formation in an ink jet system printer.

Still another object of the present invention is to provide a novel ink droplet issuance device in an ink jet system printer.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a control system is provided for varying a voltage level of an excitation signal applied to an electro-mechanical transducer which is attached to a nozzle for emitting ink droplets. A detection system is provided for detecting a charge condition of ink droplets, the detection result being indicative of the droplet formation condition. The voltage level of the excitation signal is automatically controlled in response to the detection result derived from the detection system, thereby maintaining the droplet formation condition in a preferred range without regard to the temperature variations.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 6(A) through 6(F) are time charts for explaining an operation mode of the charge condition detection unit of FIG. 5;

FIG. 7 is a circuit diagram of an embodiment of the charge condition detection unit included in the droplet formation control system of FIG. 4;

FIG. 8 is a time chart showing pumping pulses occurring within the charge condition detection unit of FIG. 7;

FIGS. 9(A), 9(B) and 9(C) are waveform charts of a detection signal derived from the charge condition detection unit of FIG. 7.

DESCRIPTION OF THE PREFERRED EMBODIMENTS

Figure 1:
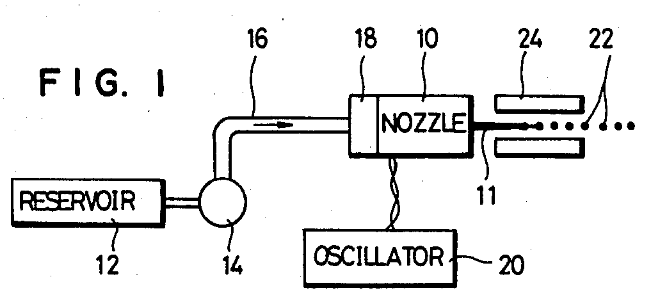
FIG. 1 is a schematic view of a droplet formation section in an ink jet system printer.

FIG. 1 schematically shows an ink droplet formation section in an ink jet system printer. The ink droplet formation section comprises a nozzle 10 for emitting an ink liquid 11 supplied from an ink liquid reservoir 12 via a pump 14 and a conduit 16. An electro-mechanical transducer 18, for example, an ultrasonic vibrator, is attached to the nozzle 10 for vibrating the nozzle 10 at a given frequency of an excitation signal derived from an oscillator 20, thereby forming ink droplets 22 at the given frequency. A charging tunnel 24 is provided for charging the ink droplets 22 in accordance with print information. The thus charged ink droplets are deflected while they pass through a deflection field established by deflection electrodes (not shown) and deposited on a recording paper (not shown).

The droplet formation condition is variable depending on the ink liquid characteristics. More specifically, when the ink liquid component or the ink liquid temperature varies, the ink liquid characteristics such as the viscosity, the surface tension and the density greatly vary and, therefore, the ink droplet formation condition varies. The charging signal application must be timed in agreement with the droplet separation timing. If the charging signal application is not synchronized with the droplet formation, the charging operation is not properly performed and, hence, a print distortion may be created.

It is conventional that a sinusoidal waveform excitation signal is applied from the oscillator 20 to the electro-mechanical transducer 18. A synchronization system is provided for shifting the charging signal with respect to the sinusoidal waveform excitation signal to achieve the proper charging operation. However, in the conventional system, the sinusoidal waveform excitation signal is fixed with respect to its phase and voltage level. The present inventors have discovered that the excitation signal voltage greatly influences on the droplet formation condition. More specifically, when the excitation signal voltage does not have a proper level, there is a possibility that a small droplet, which is referred to as a satellite droplet, is formed in addition to the ink droplets 22 subject to the charging operation. The present inventors have further discovered that the preferred voltage level of the excitation signal is dependent on the ink liquid characteristics.

Figure 2:
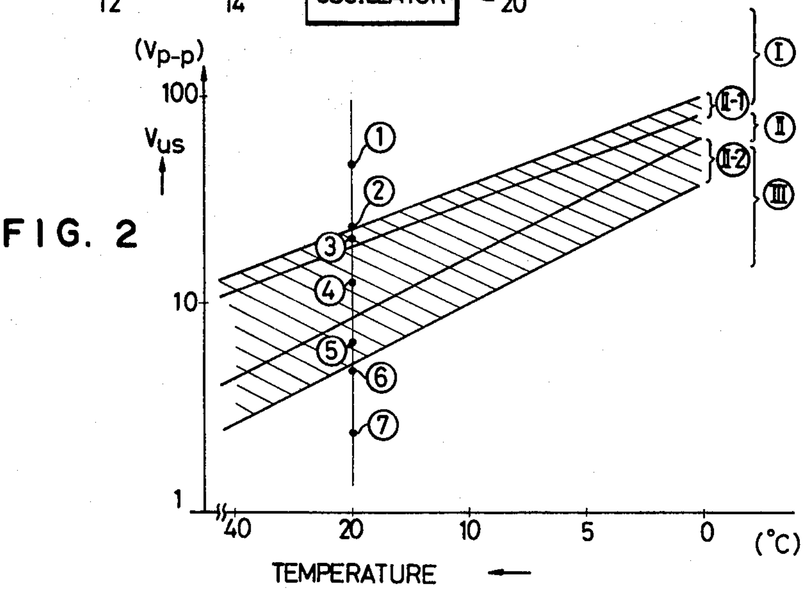
FIG. 2 is a graph showing droplet formation characteristics depending on the ambience temperature and a voltage level of an excitation signal applied to an electro-mechanical transducer.

FIG. 2 is a graph, obtained through experimentation, showing the droplet formation condition depending on the ambience temperature and the voltage level $V_{us}$ of the excitation signal applied to the electro-mechanical transducer 18. FIG. 2 is obtained under the condition where the frequency $f_{us}$ of the excitation signal is fixed to a preferred level, for example, 100 KHz, and the velocity of ink droplets 22 emitted from the nozzle 10 is fixed to a preferred level, for example, 18 m/sec.

In FIG. 2, regions I and III show the droplet formation conditions where the satellite droplets are formed. A region II is the most preferred droplet formation condition where no statellite ink droplet is formed. A region II-1, which belongs to the region I, shows the droplet formation condition where the satellite ink droplets are formed but the satellite ink droplets are combined into the ink droplets 22 shortly after the formation thereof. Another region II-2, which belongs to the region III, shows the droplet formation condition where the satellite ink droplets are formed but the satellite ink droplets are combined into the ink droplets 22 shortly after the formation thereof. Accordingly, the droplet formation condition must be maintained in the hatched portion in order to ensure the accurate printing. Points ①, ②, ③, ④, ⑤, ⑥ and ⑦ in FIG. 2 are specific detection points where the excitation signal voltage level $V_{us}$ are changed while the ambience temperature is held at 20° C.

Figure 3:
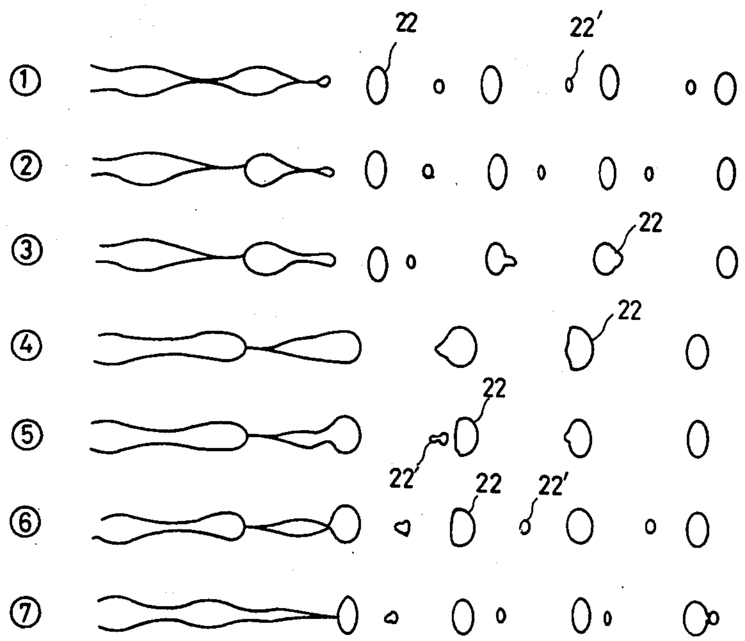
FIG. 3 is a schematic chart showing droplet formation conditions.

FIG. 3 schematically shows the droplet formation conditions at the detection points ① through ⑦ in FIG. 2. It will be clear from FIG. 3 that, at the points ①, ②, ⑥ and ⑦, satellite ink droplets 22' are formed in addition to the ink droplets 22. At the points ③ and ⑤, the satellite ink droplets 22' are formed at the same time when the ink droplets 22 are formed. However, the thus formed satellite ink droplets 22', in the conditions of the points ③ and ⑤, are immediately combined into the preceding or succeeding ink droplets 22. At the point ④, the ink droplets 22 are desirably formed without forming the satellite ink droplets 22'.

The droplet formation control system of the present invention is to adjust the voltage level $V_{us}$ of the excitation signal so that the droplet formation is performed at the points belonging to the hatched portion in FIG. 2 and, more preferably, in the region II.

Figure 4:
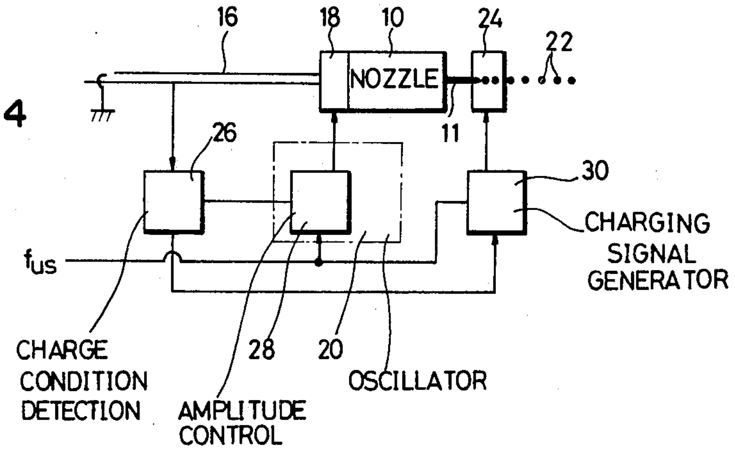
FIG. 4 is a block diagram of an embodiment of a droplet formation control system of the present invention.

FIG. 4 shows an embodiment of the droplet formation control system of the present invention. Like elements corresponding to those of FIG. 1 are indicated by like numerals.

The droplet formation control system comprises a charge condition detection unit 26, an amplitude control unit 28 for automatically varying the voltage level $V_{us}$ of the excitation signal in accordance with the detection output derived from the charge condition detection unit 26, and a charging signal generator 30 for applying the charging signal to the charging tunnel 24. The phase of the charging signal derived from the charging signal generator 30 is adjusted in accordance with the detection output derived from the charge condition detection unit 26.

The reference frequency signal $f_{us}$ is applied to the amplitude control unit 28 and the charging signal generator 30 as the base frequency signal. The charging signal generator 30 develops not only the charging signal for performing the actual printing operation but also a sampling pulse to detect the charge condition. It will be clear that the charge condition varies when the ink droplet formation condition varies. Accordingly, the detection output of the charge condition detection unit 26 is indicative of the ink droplet formation condition.

Figure 5:
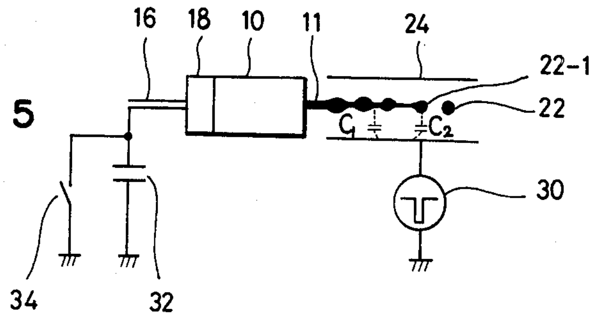
FIG. 5 is a schematic circuit diagram of a charge condition detection unit included in the droplet formation control system of FIG. 4.

FIG. 5 shows a detection principle of the charge condition detection unit 26. Like elements corresponding to those of FIGS. 1 and 4 are indicated by like numerals.

The conduit 16 is a metal conduit which is in contact with the ink liquid 11. A capacitor 32 is disposed between the metal conduit 16 and the grounded terminal. A switch 34 is connected to the capacitor 32 in a parallel fashion. When the charging signal or the sampling pulse is applied to the charging tunnel 24 from the charging signal generator 30, a predetermined charge is induced in the ink liquid 11 at the end thereof. If the ink droplet 22 separates from the solid ink liquid 11 when the charging signal or the sampling signal is applied to the charging tunnel 24, the ink droplet 22 carries the induced charge and, hence, the corresponding charge is charged on the capacitor 32. Therefore, a voltage appears across the capacitor 32, of which the level is indicative of the charge condition of the ink droplet 22. More specifically, if the droplet separation and the charging signal application are not synchronized with each other, no voltage appears across the capacitor 32.

The charging signal generator 30 can develop the sampling pulse in desired phases with respect to the base frequency signal, which has a frequency $f_{us}$. FIG. 6(A) shows the sinusoidal waveform excitation signal $V_{us}$ developed from the oscillator 20 and applied to electro-mechanical transducer 18. FIG. 6(B) shows an example of the droplet formation condition wherein the satellite ink droplet 22' is formed in addition to the required ink droplet 22. FIG. 6(C) shows an example of the sampling pulse which has a fixed phase with respect to the sinusoidal waveform excitation signal $V_{us}$. FIG. 6(D) shows another example of the sampling pulse which has two phases with respect to the sinusoidal waveform excitation signal $V_{us}$. FIG. 6(E) shows still another example of the sampling pulse which is divided by four with respect to the base frequency signal. FIG. 6(F) shows yet another example of the sampling pulse which is divided by "n" with respect to the base frequency signal.

Now assume that the sampling pulse as shown in FIG. 6(E) is applied from the charging signal generator 30 to the charging tunnel 24 under the condition where the ink droplets 22 and the satellite ink droplets 22' are formed as shown in FIG. 6(B). The switch 34 is first instantaneously switched ON to reset the capacitor 32. When the first sampling pulse $V_1(4)$, having a voltage level $-V$, is applied to the charging tunnel 24, a charge is induced in the solid ink jet 11, the level of which is determined by the capacitance C of the capacitor 32, the suspended capacitance $C_1$ created between the charging tunnel 24 and the solid ink jet 11, and the suspended capacitance $C_2$ created between the charging tunnel 24 and the now separating ink droplet 22-1. If the capacitance C is selected sufficiently greater than $(C_1+C_2)$, the voltage appearing across $C_1$ or $C_2$ becomes substantially identical with V. The thus induced charge disappears when the application of the first sampling pulse $V_1(4)$ is terminated. However, if the ink droplet 22-1 actually separates from the solid ink jet 11 when the first sampling pulse $V_1(4)$ is applied to the charging tunnel 24, the ink droplet 22-1 carries the charge $q_1(=C_2'.V)$. And, the charge $-q_1$ is stored on the capacitor 32 because $C>C_1$.

After resetting the capacitor 32 through the use of the switch 34, the second sampling pulse $V_2(4)$ is applied from the charging signal generator 30 to the charging tunnel 24. Since the satellite ink droplet 22' separates from the solid ink jet 11 while the second sampling pulse $V_2(4)$ is applied to the charging tunnel 24, a charge $q_2(=C_2''.V)$ is stored on the capacitor 32. When the third sampling pulse $V_3(4)$ or the fourth sampling pulse $V_4(4)$ is applied to the charging tunnel 24, no ink droplet separates from the solid ink jet 11 and, therefore, no charge is stored on the capacitor 32. Accordingly, the voltage level appearing across the capacitor 32 shows the charging condition or the droplet formation condition. If the division ratio of the sampling pulse is increased, the detection accuracy is increased.

FIG. 8 shows a preferred sampling pulse $V_j(n)$, which is applied to the charging tunnel 24 for a period corresponding to m times period of the base frequency signal $f_{us}$. The detection sensitivity is increased by m times by accumulating the charge amount $q_j$ by m times. Generally, the voltage $V_{cj}$ appearing across the capacitor (C) is expressed as follows when the n-divided sampling pulse $V_j(n)$ is applied to the charging tunnel 24.

$$V_{cj}=m(q_j/C) \quad (1)$$

$j=1,2,\ldots,$ n; and

$q_j$ is the charge amount at the j period of the n-divided sampling pulse $V_j(n)$.

FIG. 7 shows an embodiment of the charge condition detection unit 26. Like elements corresponding to those of FIGS. 4 and 5 are indicated by like numerals.

A detection electrode terminal 36 is secured to the metal conduit 16, which is connected to the capacitor 32. A resistor 38 is connected to the capacitor 32 in a parallel fashion, the resistor 38 functioning as the switch 34 in FIG. 5. A low-band amplifier 40 is connected to the capacitor 32 for amplifying the charge voltage level of the capacitor 32. The resistor 38 functions to discharge the charge stored on the capacitor 32 in accordance with the time constant determined by the capacitor 32 and the resistor 38. The time constant is selected between the base period $(1/f_{us})$ and the searching period $(m\times 1/f_{us})$. With such a circuit construction, when the sampling pulse voltage signal $V_j(n)$ is applied to the charging tunnel 24 for the m period as shown in FIG. 8, the charge proportional to the charge amount $q_j$ is accumulated on the capacitor 32. Accordingly, the voltage level $V_{cj}$ is proportional to the expression (1) and shown in the following expression (2).

$$V_{cj}\propto m(q_j/C)(j=1, 2, \ldots, n) \quad (2)$$

Each sampling pulse is monitored for $m\times n$ period to obtain a series charge condition in one cycle of the excitation. That is, a series waveform voltage $V_c(t)$ appears across the capacitor 32.

$$V_c(t) = \sum_{j=1}^{n} V_{cj} \quad (3)$$

In the actual system, the detection accuracy is limited because the division ration n is limited due to the ink liquid resistance, the capacitance leak, and the saturation period and the discharging period for applying the search pulse signal. FIGS. 9(A) through 9(C) show output waveforms derived from the low-band amplifier 40. More specifically, FIG. 9(B) shows a preferred output waveform wherein no satellite ink droplet is observed. That is, FIG. 9(B) corresponds to the droplet formation conditions ③, ④ and ⑤ shown in FIGS. 2 and 3. FIG. 9(A) includes a waveform peak corresponding to the satellite ink droplet 22' which is formed as shown in the conditions ① and ② of FIG. 3. FIG. 9(C) also includes a waveform peak formed by the satellite ink droplet 22' shown in the conditions ⑥ and ⑦ of FIG. 3.

Therefore, if the detection waveform as shown in FIG. 9(C) is obtained from the charge condition detection unit 26, the amplitude control unit 28 operates to increase the voltage level of the excitation signal to be applied to the electro-mechanical transducer 18, thereby shifting the droplet formation condition toward the hatched portion in FIG. 2. In this way, when the droplet formation condition has been shifted into the hatched portion of FIG. 2, the charge condition detection unit 26 develops the preferred detection output as shown in FIG. 9(B) and, therefore, the excitation signal voltage level is maintained at that value.

The detection output of the charge condition detection unit 26 is also used to synchronize the charging signal application timing with the droplet separation timing. More specifically, the actual print charging signal is developed from the charging signal generator 30 toward the charging tunnel 24 at the timing of the sampling pulse $V_{jm}(n)$ at which the waveform peak of FIG. 9(B) is obtained.

Figure 10:
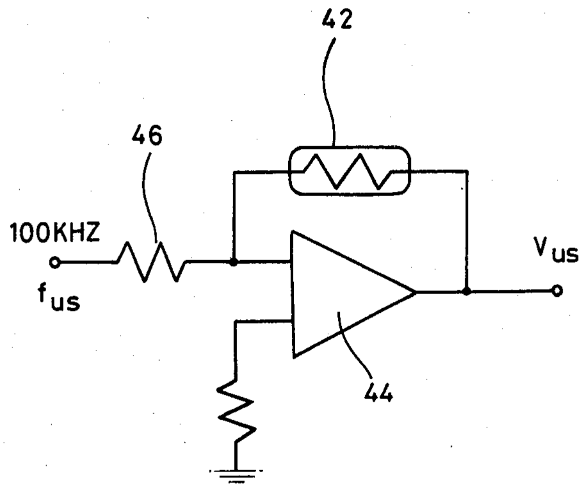
FIG. 10 is a circuit diagram of another embodiment of an excitation voltage varying circuit included in the droplet formation control system of the present invention.

In the above discussed embodiments, the droplet formation condition is detected through the use of the charge condition detection unit 26. FIG. 10 shows another embodiment of the excitation voltage varying circuit, wherein the excitation signal voltage is varied in response to the ambience temperature variation.

The excitation voltage varying circuit of FIG. 10 comprises a thermistor 42, and an operation amplifier 44 which receives the base frequency signal $f_{us}$ through a resistor 46. The output voltage level of the operation amplifier 44 is automatically, variably controlled through the use of the thermistor 42. The output signal derived from the operation amplifier 44 is applied to the electro-mechanical transducer 18. More specifically, when the ambience temperature increases, the resistance value of the thermistor 42 varies to reduce the gain of the operation amplifier 44. Since the resistance value of the thermistor 42 varies in accordance with the logarithmic function, the excitation signal voltage level is varied logarithmically. Therefore, the excitation signal voltage level is automatically held in the hatched portion of FIG. 2 even when the ambience temperature varies.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An automatic ink droplet formation control system in an ink jet system printer which includes a nozzle for emitting an ink jet, an electro-mechanical transducer secured to the nozzle for vibrating the nozzle in response to an excitation signal of a given frequency, thereby forming ink droplets at the given frequency, and charging means for charging the ink droplets in accordance with print information, said automatic ink droplet formation control system comprising:

variation means for automatically varying a voltage level of said excitation signal to be applied to said electro-mechanical transducer; and control means for developing a control signal to said variation means for automatically maintaining said voltage level of said excitation signal within a range where no satellite ink droplet is formed;

said control means including a charge detection unit for detecting a charge condition of said ink droplets effected by said charging means in order to monitor the occurrence of said satellite ink droplets.

2. An automatic ink droplet formation control system of claim 1, said charge condition detection unit comprising:

a metal member electrically making contact with said ink jet emitted from said nozzle;

a capacitor electrically connected to said metal member;

a search pulse generation circuit for applying a search pulse to said charging means; and detection means for detecting a charge level stored on said capacitor.

3. An automatic ink droplet formation control system in an ink jet system printer which includes a nozzle for emitting an ink jet, an electro-mechanical transducer secured to the nozzle for vibrating the nozzle in response to an excitation signal of a given frequency, thereby forming ink droplets at the given frequency, and charging means for charging the ink droplets in accordance with print information, said automatic ink droplet formation control system comprising:

variation means for automatically varying a voltage level of said excitation signal to be applied to said electro-mechanical transducer; and control means for developing a control signal to said variation means for automatically maintaining said voltage level of said excitation signal within a range where no satellite ink droplet is formed;

said control means including an ambient temperature detection means for developing said control signal to said variation means in response to variations of the ambient temperature.

4. An automatic ink droplet formation control system of claim 3, wherein said voltage level of said excitation signal is reduced when the ambient temperature increases.

5. An automatic ink droplet formation control system of claim 1, 2, 4 or 3 wherein said given frequency is 100 KHz.

6. An automatic ink droplet formation control system of claim 5, wherein said ink droplets have a travelling velocity of about 18 m/sec.

7. An automatic ink droplet formation control system according to claim 2, wherein said charge condition detection unit further includes a switch means operatively connected in parallel with said capacitor for resetting the capacitor.

8. An automatic ink droplet formation control system according to claim 2, wherein said charge condition detection unit further includes a resistor operatively connected in parallel with said capacitor for discharging the charge stored on the capacitor in accordance with a time constant which is a function of the capacitor and the resistor.

9. An automatic ink droplet formation control system according to claim 8, wherein said charge condition detection unit further includes an amplifier operatively connected to said capacitor for amplifying the charge voltage level of the capacitor.

10. An automatic ink droplet formation control system according to claim 3, said ambient temperature detection means comprising:

a thermistor operatively connected in parallel to an operation amplifier;

said operation amplifier being operatively connected through a resistor to receive a base frequency signal.

11. An ink droplet formation control system in an ink jet system printer which includes a nozzle for emitting an ink jet, an electro-mechanical transducer secured to the nozzle for vibrating the nozzle in response to an excitation signal of a given frequency, thereby forming ink droplets at the given frequency, and charging means for charging the ink droplets in accordance with print information, said ink droplet formation control system comprising:

variation means for varying a voltage level of said excitation signal to be applied to said electro-mechanical transducer; and control means for developing a control signal to said variation means for maintaining said voltage level of said excitation signal within a range where no satellite ink droplet is formed;

said control means including a charge condition detection unit for detecting a charge condition of said ink droplets effected by said charging means in order to monitor the occurrence of said satellite ink droplets.

12. An ink droplet formation control system according to claim 11, said charge condition detection unit comprising:

a metal member electrically making contact with said ink jet emitted from said nozzle;

a capacitor electrically connected to said metal member;

a search pulse generation circuit for applying a search pulse to said charging means; and detection means for detecting a charge level stored on said capacitor.

13. An ink droplet formation control system in an ink jet system printer which includes a nozzle for emitting an ink jet, an electro-mechanical transducer secured to the nozzle for vibrating the nozzle in response to an excitation signal of a given frequency, thereby forming ink droplets at the given frequency, and charging means for charging the ink droplets in accordance with print information, said ink droplet formation control system comprising:

variation means for varying a voltage level of said excitation signal to be applied to said electro-mechanical transducer; and control means for developing a control signal to said variation means for maintaining said voltage level of said excitation signal within a range where no satellite ink droplet is formed;

said control means including an ambient temperature detection means for developing said control signal to said variation means in response to variations of the ambient temperature.

14. An ink droplet formation control system according to claim 13, wherein said voltage level of said excitation signal is reduced when the ambient temperature increases.

15. An ink droplet formation control system according to claim 11, 12, 13 or 14, wherein said given frequency is 100 KHz.

16. An ink droplet formation control system according to claim 15, wherein said ink droplets have a travelling velocity of about 18 m/sec.

* * * * *